(12) United States Patent
Shoya et al.

(10) Patent No.: US 8,248,424 B2
(45) Date of Patent: Aug. 21, 2012

(54) WRITING CONTROL SYSTEM

(75) Inventors: Tomoyuki Shoya, Kanagawa (JP); Tsutomu Ishii, Kanagawa (JP); Akira Ichiboshi, Kanagawa (JP); Hajime Ueno, Kanagawa (JP); Yoko Kurihara, Kanagawa (JP); Minoru Koshimizu, Kanagawa (JP); Yasunori Saito, Kanagawa (JP); Shigehiko Sasaki, Kanagawa (JP); Masahiro Sato, Kanagawa (JP); Toshiroh Shimada, Kanagawa (JP); Kyotaro Tomoda, Kanagawa (JP); Naoki Hayashi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1104 days.

(21) Appl. No.: 12/138,969

(22) Filed: Jun. 13, 2008

(65) Prior Publication Data

US 2009/0085930 A1 Apr. 2, 2009

(30) Foreign Application Priority Data

Oct. 1, 2007 (JP) ................................. 2007-257255

(51) Int. Cl.
*G09G 5/39* (2006.01)
*G06T 1/60* (2006.01)
(52) U.S. Cl. ....................................... 345/531; 345/530
(58) Field of Classification Search .................. 345/530
See application file for complete search history.

(56) References Cited

U.S. PATENT DOCUMENTS

| 6,906,705 B2 * | 6/2005 | Matsuo et al. ................. 345/206 |
| 2004/0194133 A1 | 9/2004 | Ikeda et al. |
| 2007/0174918 A1 * | 7/2007 | Hirose et al. ..................... 726/26 |
| 2007/0176850 A1 * | 8/2007 | Hirose et al. ..................... 345/30 |

FOREIGN PATENT DOCUMENTS

| JP | A-2003-288178 | 10/2003 |
| JP | A-2004-286952 | 10/2004 |
| JP | A-2004-318834 | 11/2004 |
| JP | A-2005-327159 | 11/2005 |
| JP | A-2005-346599 | 12/2005 |
| JP | A-2006-053686 | 2/2006 |
| KR | 10-2000-0058503 A | 10/2000 |

OTHER PUBLICATIONS

Oct. 31, 2011 Korean Office Action issued in Korean Patent Application No. 10-2008-0071493 (with Translation).

* cited by examiner

*Primary Examiner* — Jacinta M Crawford
(74) *Attorney, Agent, or Firm* — Oliff & Berridge, PLC

(57) ABSTRACT

A writing control system includes a display holding medium, a reading unit, an identifying unit, a control unit and a writing unit. The display holding medium includes a display section capable of displaying and holding an image in a no-power state and a storage section having a storage area for storing information that identifies an electronic document associated with it. The reading unit reads the information from the storage section when the display holding medium is located in a predetermined position. The identifying unit identifies the electronic document associated with the display holding medium, based on the information read from the display holding medium. When the electronic document associated with the display holding medium is not identified, the control unit performs control so that a page image, which has not been written, of an electronic document, which is used in last image writing, is set as a writing target.

12 Claims, 11 Drawing Sheets

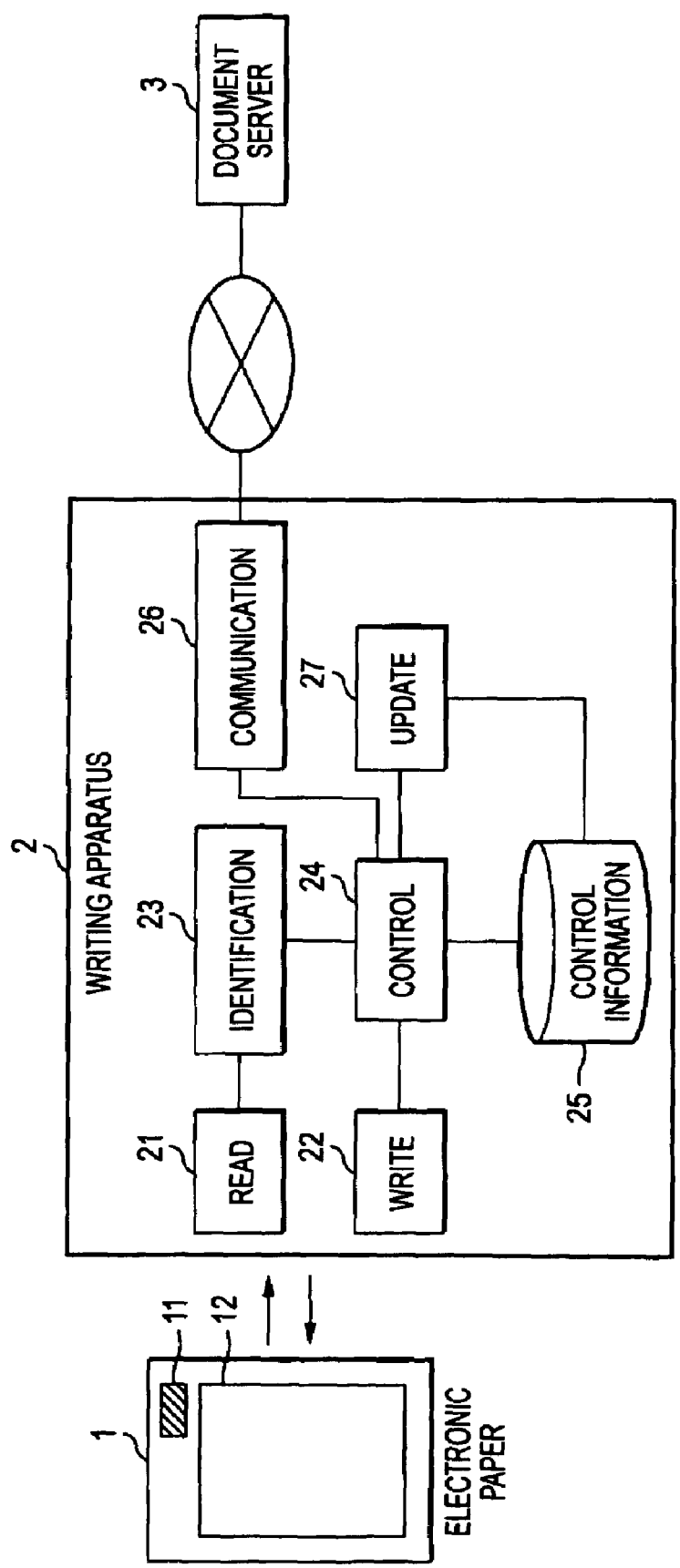

FIG. 2A

| ITEM | | R/W | DATA |
|---|---|---|---|
| MEDIUM ID | | RO | MEDIA ID |
| NUMBER OF PIXELS | | RO | 4,000 x 3,000 |
| DOCUMENT ID | | RW | NULL |
| DISPLAY FORMAT | FIRST PAGE | RW | NULL |
| | SECOND PAGE | RW | NULL |
| | | | |

FIG. 2B

| ITEM | | R/W | DATA |
|---|---|---|---|
| MEDIUM ID | | RO | MEDIA ID |
| NUMBER OF PIXELS | | RO | 4,000 x 3,000 |
| DOCUMENT ID | | RW | Document-UUID |
| DISPLAY FORMAT | FIRST PAGE | RW | 2UP |
| | SECOND PAGE | RW | 4UP |
| | | | |

CONTROL INFORMATION

| DOCUMENT ID | ... |
|---|---|
| WRITE PAGE | ... |
| DISPLAY FORMAT | ... |

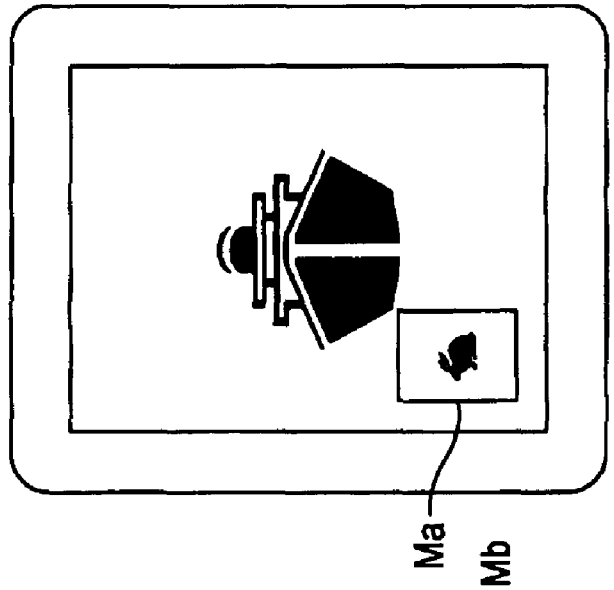
FIG. 7A  REPRESENTATIVE PAGE
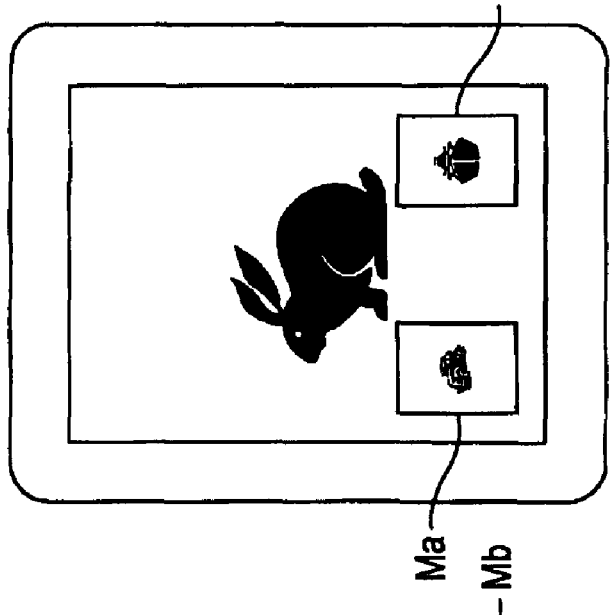
FIG. 7B  INTERMEDIATE PAGE
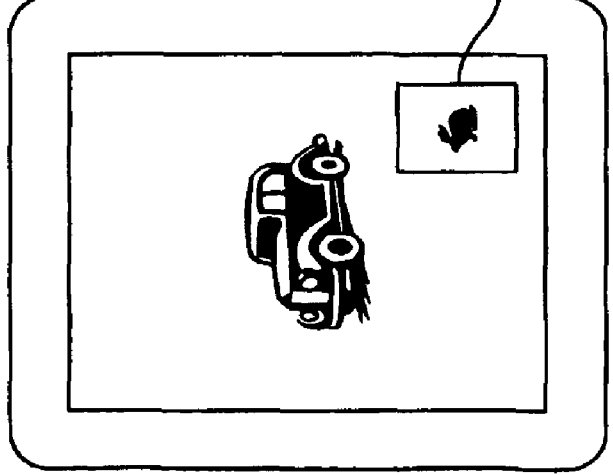
FIG. 7C  LAST PAGE

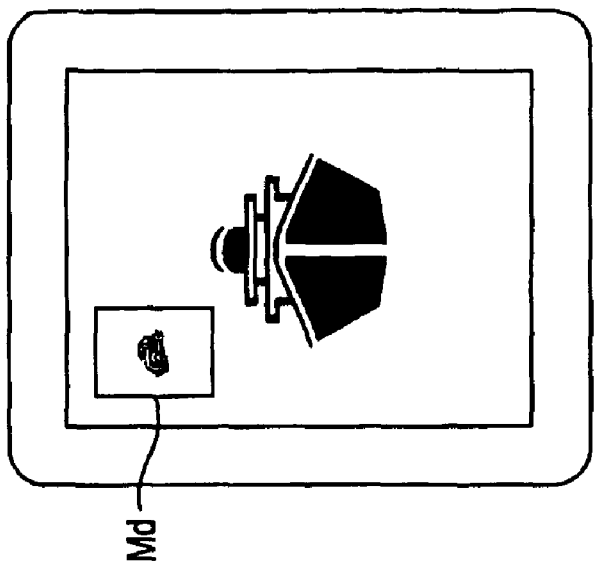
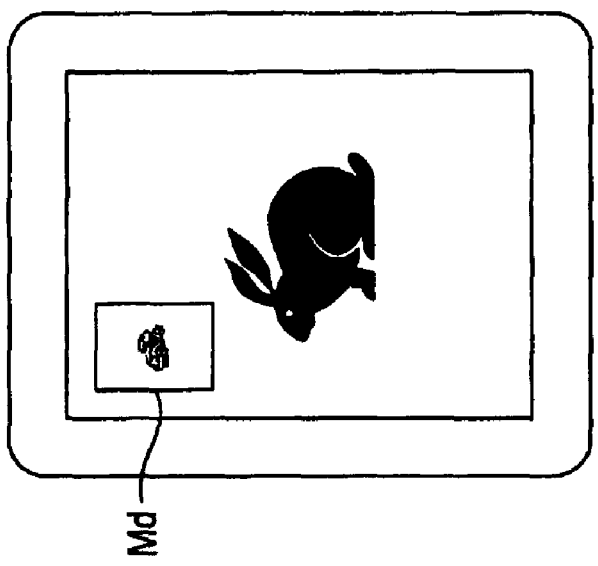
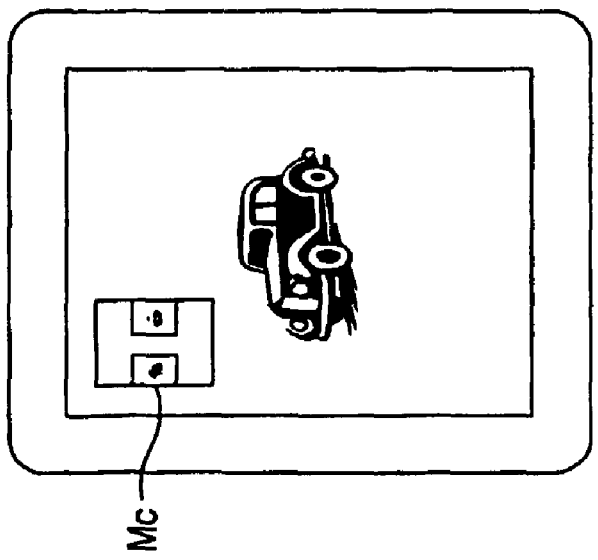

| MEDIUM ID | DOCUMENT ID |
|---|---|
| ⋮ | ⋮ |

| WRITING APPARATUS ID | CONTROL INFORMATION |
|---|---|
| ⋮ | ⋮ |

WRITING CONTROL SYSTEM

CROSS-REFERENCE TO RELATED APPLICATIONS

This application is based on and claims priority under 35 USC 119 from Japanese Patent Application No. 2007-257255 filed Oct. 1, 2007.

BACKGROUND

1. Technical Field

The invention generally relates to a writing control system, a writing apparatus, a management apparatus, a computer-readable medium and a computer data signal.

2. Related Art

A display holding medium (so called "electronic paper") capable of displaying and holding a document image in a no-power state and rewriting the document image is put to practical use, and it is desired to expand the use of such a display holding medium as a display medium in place of paper.

Electronic papers are classified into various types depending on image writing methods. For example, an electronic paper of a two-dimensional projection type optical writing method is caused to display and hold an image by projecting the image into the electronic paper with a writing apparatus. Also, an electronic paper of an electronic writing method is caused to display and hold an image by writing electronic data with a writing apparatus.

In the electronic papers of either method, the electronic paper is convenient to carry the displayed image and is useful as a medium for displaying an image in a mobile environment.

SUMMARY

According to an aspect of the invention, a writing control system includes a display holding medium, a reading unit, an identifying unit, a control unit and a writing unit. The display holding medium includes a display section capable of displaying and holding an image in a no-power state and rewriting the image, and a storage section having a storage area for storing information that identifies an electronic document associated with the display holding medium. The reading unit reads the information from the storage section of the display holding medium when the display holding medium is located in a predetermined position. The identifying unit identifies the electronic document associated with the display holding medium, based on the information read from the display holding medium. When the electronic document associated with the display holding medium is not identified, the control unit performs control so that a page image, which has not been written, of an electronic document, which is used in last image writing, is set as a writing target. The writing unit writes the page image of the writing target into the display section of the display holding medium.

BRIEF DESCRIPTION OF THE DRAWINGS

FIG. 1 is a functional block diagram showing a writing control system according to an exemplary embodiment of the invention;

FIGS. 2A and 2B are diagrams showing examples of data stored in a storage section of an electronic paper according to the exemplary embodiment of the invention;

FIGS. 7A to 7C are diagrams showing examples of writing performed by the writing control system according to the exemplary embodiment of the invention;

FIGS. 8A to 8C are diagrams showing examples of writing performed by the writing control system according to the exemplary embodiment of the invention;

DETAILED DESCRIPTION

Figures 3, 4:
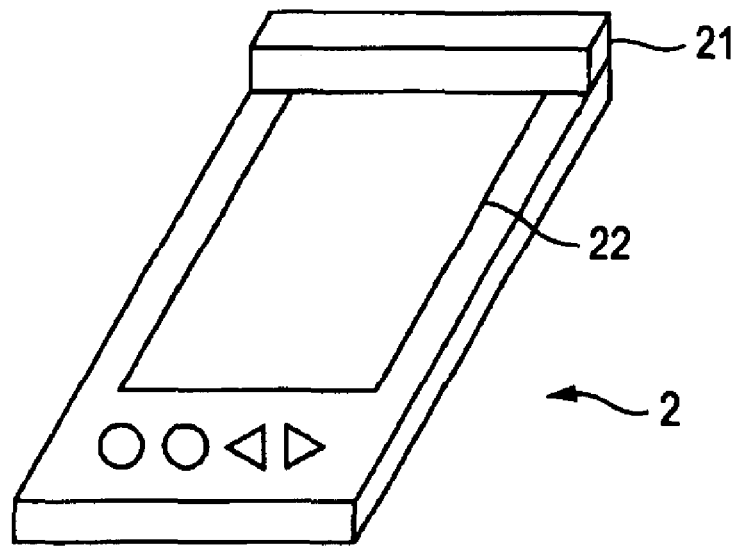
FIG. 3 is a diagram showing an example of data stored in a control-information storage device according to the exemplary embodiment of the invention.
FIG. 4 is a diagram showing an external view of a writing apparatus according to the exemplary embodiment of the invention.

First, an electronic paper (display holding medium) which can be used in a writing control system according to exemplary embodiments of the invention will be described.

There are various image writing methods for the electronic paper. In this exemplary embodiment, description will be given on an electronic writing type electronic paper into which an image is written electronically by a writing apparatus, and an optical writing type electronic paper into which an image is written by projecting two-dimensional image light by a writing apparatus.

The electronic writing type electronic paper is a flexible thin medium having, for example, an A4 size and has a structure in which fine coloring particles (for example, white and black particles) used as toner in a copier are enclosed between a pair of front and rear electrodes and this assembly is sandwiched between a pair of front and rear film substrates. At least the front surface of the pair of electrodes is transparent. At least the front surface is transparent. An air layer is provided between the electrode layers so that the coloring particles can move freely. Also, an insulation layer is provided in a matrix-shaped electrode layer to prevent the electrode layer from being in contact with the coloring particles. It is also possible to realize a color display with a simple configuration by using a color filter.

In the electronic writing type electronic paper, in a state where no voltage is applied to the electrodes, the negatively charged white particles are collected on the rear side while the positively charged black particles are collected on the front side, so that the electronic paper appears black when viewed from the front side. Also, when a writing unit (driver) of the writing apparatus is operated in accordance with electronic data to reverse the electrode polarity in a predetermined portion of the matrix which corresponds to an image displayed, a positional relationship between the white and black particles are switched, and an image is displayed by the contrast between the white and black particles. Furthermore, by operating the driver of the writing apparatus in accordance with different electronic data, the image which is displayed by the contrast between the white and black particles can be changed, so that the electronic paper can be reused repeatedly.

The optical writing type electronic paper is a flexible thin medium having, for example, an A4 size. In the optical writing type electronic paper, when an image is displayed on a writing unit (liquid crystal panel) of a writing apparatus and light is irradiated to the electronic paper being placed on the liquid crystal panel while applying a voltage to a writing electrode of the electronic paper from an external power source, the image displayed on the liquid crystal panel can be transferred to and stored in the electronic paper. Therefore, in the optical writing type electronic paper, the transferred image can be held in the displayed state even after the voltage applied to the writing electrode is removed.

The optical writing type electronic paper has the structure in which a layer of organic photoconductive material (organic photoconductive layer) used in a copier is combined with a layer of liquid crystal display material (microencapsulated cholesteric liquid crystal layer), the layers being sandwiched by a pair of front and rear transparent electrodes, and the laminated body being sandwiched by a pair of front and rear transparent material film. This configuration enables a monochromatic image display including a white display of light, which is reflected by the cholesteric liquid crystal layer, and a black display of light, which passes through the liquid crystal layer and is absorbed by a black layer provided between the cholesteric liquid crystal layer and the organic photoconductive layer. Furthermore, the cholesteric liquid crystal has characteristic of interference reflection of color light corresponding to a spiral pitch. Therefore, if the cholesteric liquid crystal layer is formed to include layers of liquid crystal having different spiral pitches, it is also possible to realize a color display with a simple structure.

FIG. 1 is a functional block diagram of a writing control system according to an exemplary embodiment of the invention.

The writing control system of this example includes an electronic paper 1, a writing apparatus 2 for writing a page image of an electronic document on the electronic paper 1 and causes the electronic paper 1 to display the page image of the electronic document, and a document server 3 for storing data of the electronic document. The writing apparatus 2 and the document server 3 are connected via a network.

The electronic paper 1 includes a display section 12, on its medium surface, capable of displaying and holding an image in a non-power state and rewriting the image. The electronic paper 1 also includes a storage section 11, in a medium end, for storing information relating to the electronic paper 1.

As shown in FIGS. 2A and 2B, the storage section 11 includes a first area for storing information unique to the electronic paper 1 such as "medium ID" that identifies the electronic paper 1 and "number of pixels". In addition to the first area, the storage section 11 includes a second area for storing information that can be changed in accordance with association between the electronic paper and an electronic document, such as a "document ID" for identifying the electronic document associated with the electronic paper 1 and a "display format" for identifying a format for displaying page images of the electronic document. FIG. 2A shows the state where no information is stored in the second area, i.e., showing the state where the electronic paper 1 is not associated with an electronic document. FIG. 2B shows the state where information is stored in the second area, i.e., shows the state where the electronic paper 1 is associated with an electronic document.

The writing apparatus 2 includes a writing unit 22 for writing a page image of an electronic document into the display section 12 of the electronic paper 1, a reading unit 21 for reading information from the storage section 11 of the electronic paper 1, an identifying unit 23 for identifying an electronic document associated with the electronic paper 1, a control unit 24 for controlling image writing for the electronic paper 1, a control-information storage device 25 for storing control information that is used in the writing control, a communication unit 26 for communicating with other devices or apparatuses and an update unit 27 for updating the control information, which is stored in the control-information storage device 25.

In this example, since the electronic paper 1 employs an optical writing type that projects a two-dimensional image light, the writing unit 22 is constructed by a liquid crystal panel that projects a page image onto the display section 12 of the electronic paper 1. However, if the electronic paper 1 employs another writing type, the writing unit 22 may be constructed to correspond to the writing type (writing method).

FIG. 3 shows an example of stored data. The control information stored in the control-information storage device 25 includes a "document ID" for identifying an electronic document to be written by the writing apparatus 2, a "written page" for identifying a page (pages) of the electronic document which has (have) not yet been written, and a "display format" for identifying a format for displaying a page image of the electronic document (for example, color/monochrome display, a conversion ratio of an image size, and number of pages to be displayed on one sheet of an electronic paper).

In this example, a page number of the last written page of an electronic document corresponding to the "document ID" is set (stored) as the "written page." However, atop page number among the pages, which have not yet been written, may be set (stored) as the "written page," or a flag indicating as to whether or not writing has been completed may be set for each page. Alternatively, information that can identify a page, which has not been written, of the electronic document may be set (stored).

FIG. 4 shows an external appearance of the writing apparatus 2. The reading unit 21 and the writing unit 22 of the writing apparatus 2 are provided to correspond to arrangement of the storage section 11 and the display section 12 of the electronic paper 1.

In this example, when the storage section 11 of the electronic paper 1 is placed to face the reading unit 21 while the display section 12 of the electronic paper 1 overlaps with the writing unit 22 (liquid crystal panel), the reading unit 21 reads information from the storage section 11 of the electronic paper 1 by wireless communication (or wire communication). However, the information may be read by wireless communication when the electronic paper 1 is held over the reading unit 21. Also, when a mechanism is provided for drawing an electronic paper out of a tray on which plural sheets of electronic paper are stacked, conveying the electronic paper to a writing position, and writing data into the electronic paper, an information reading apparatus may be provided in the conveyance path.

Figure 5:
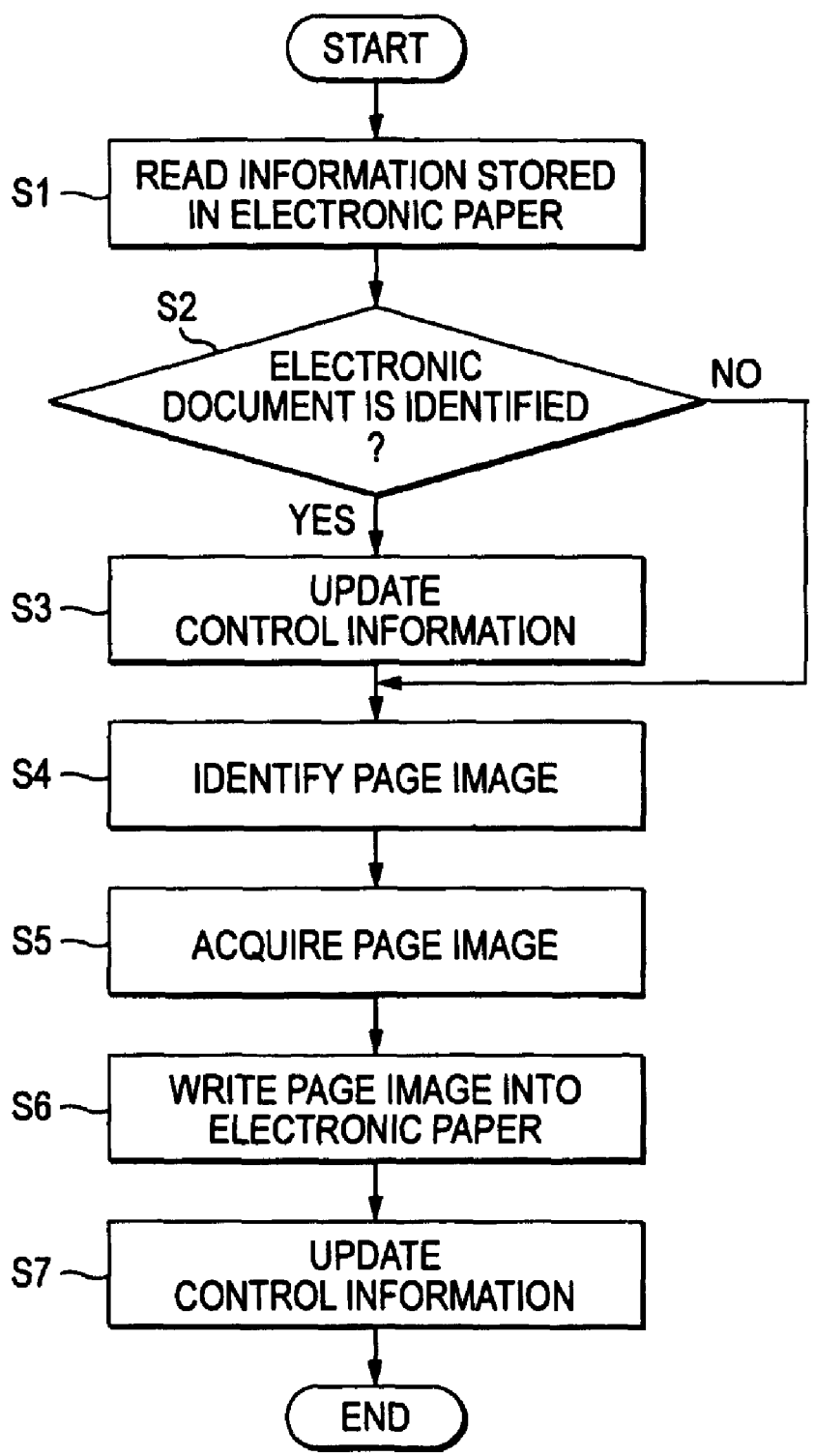
FIG. 5 is a flow chart showing processes of writing control according to the exemplary embodiment of the invention.

The writing control process performed by the writing control system of this exemplary embodiment will be described with reference to the process flow shown in FIG. 5.

When a user presents the electronic paper 1 to the writing apparatus 2, the reading unit 21 of the write apparatus 2 reads information stored in the storage section 11 of the electronic paper 1 (step S1). Then, the identifying unit 23 identifies an electronic document associated with the electronic paper 1 (step S2). That is, if a "document ID" is stored in the storage section 11 of the electronic paper 1, an electronic document corresponding to the "document ID" is identified. On the other hand, if the "document ID" is not stored in the storage section 11, an electronic document is not identified. The identifying unit 23 also performs a similar operation when identifying a display format of a page image (page images) of the electronic document.

If the electronic document associated with the electronic paper 1 is identified, the update unit 27 updates control information stored in the control-information storage device 25 (step S3). Specifically, the "document ID" and the "display format" of the control information are updated with the "document ID" and the "display format", which are read from the storage section 11 of the electronic paper 1. Then, the "written page" of the control information is reset.

Then, the control unit 24 identifies a page to be written based on the control information stored in the control-information storage device 25 (step S4). That is, a page of the electronic document associated with the presented electronic paper 1 is identified as a writing target. Generally, the first page of the electronic document is identified. However, for example, if information indicating that N pages are to be displayed on one sheet of an electronic paper is set for the "display format" of the control information, the first to N-th pages of the electronic document are identified.

The control unit 24 acquires an image of the identified page to be written, by requesting to the document server 3 (step S5). The page image is generated in accordance with the "display format" of the control information. In this exemplary embodiment, the page image is generated by the document server 3. However, the writing apparatus 2 may have a function of generating the page image. Also, in this exemplary embodiment, the page image is generated whenever a page to be written is identified. However, an image of the entire pages of an electronic document may be generated in advance when an electronic document associated with the electronic paper 1 is identified.

Subsequently, the control unit 24 supplies the acquired page image to be written to the writing unit 22 to cause the page image to be written and displayed on the display section 12 of the electronic paper 1 (step S6). In response to the writing of the page image into the electronic paper 1, the update unit 27 updates the control information stored in the control-information storage device 25 (step S7). That is, upon completion of writing of the first page (or the first to N-th pages) of the electronic document associated with the electronic paper 1, the "written page" of the control information is updated.

On the other hand, if the electronic document is not identified in step S2, the process of updating the control information in step S3 is omitted. A page (pages), which has (have) not been written, of the electronic document, which is used in the last image writing, is identified as a page to be written (step S4).

That is, the control unit 24 identifies a page to be written (the page, which has not been written, of the electronic document, which is used in the last image writing) based on the control information stored in the control-information storage device 25 and causes the writing unit 22 to write and display the image of the identified page to be written on the display section 12 of the electronic paper 1. Also, in response to the writing of the page image into the electronic paper 1, the update unit 27 updates the control information stored in the control-information storage device 25.

In this way, when an electronic paper 1 associated with an electronic document is presented to (placed on or held over) the writing apparatus 2, an electronic document to be written by the writing apparatus 2 is switched, and a page image of the electronic document is written into the electronic paper 1. If an electronic paper 1 not associated with an electronic document is presented to the writing apparatus 2, a subsequent page image (page image which has not been written) of the electronic document, which is written in the previous time by the writing apparatus 2, is written into the electronic paper 1.

Figure 6:
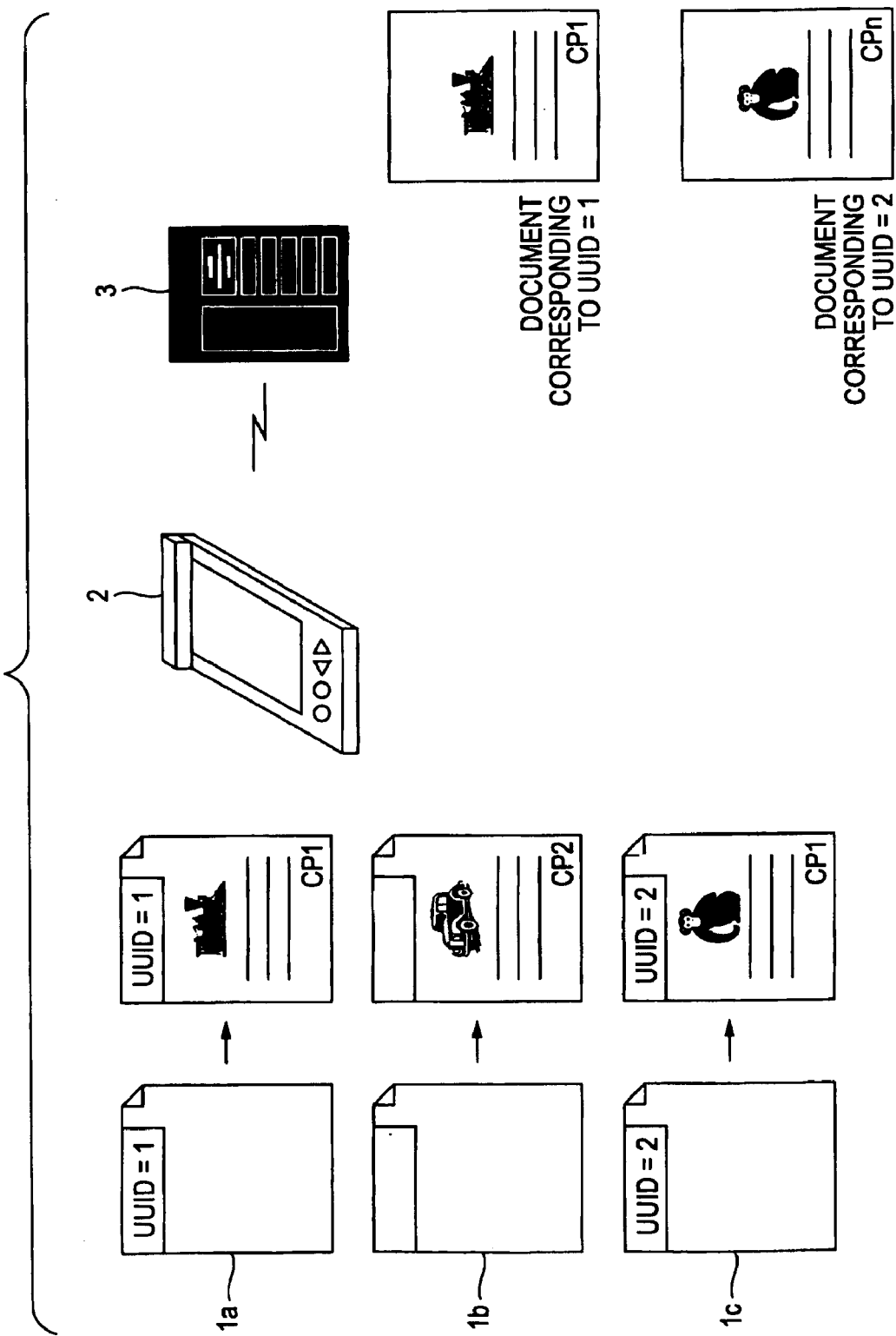
FIG. 6 is a diagram showing an example of writing performed by the writing control system according to the exemplary embodiment of the invention.

Specifically, as shown in FIG. 6, if an electronic paper 1a in which "1" is set for a document ID (UUID) is presented, a page image of the first page of an electronic document corresponding to this document ID is written and displayed on the electronic paper 1a. If an electronic paper 1b in which no document ID is set is presented subsequent to the electronic paper 1a, a page image of the subsequent, second page of the electronic document (document ID="1"), which is written in the previous time, is written and displayed on the electronic paper 1b. If an electronic paper 1c in which "2" is set for the document ID is presented, even though the third or later pages are present in the electronic document being displayed, a page image of the first page of an electronic document corresponding to the document ID "2" is written and displayed on the electronic paper 1c.

Also, there may be the case in which a user wants to consecutively write pages of an electronic document only into an electronic paper (electronic papers) for which an electronic document is not identified, or the case in which a user does not want to write a page image of an electronic document into an electronic paper even if the electronic document is associated with the electronic paper. In such cases, even if the electronic document associated with the electronic paper 1 is identified, the process of updating the control information in step S3 and the process of writing the page image in step S6 are not performed. Instead, for example, an alarm message may be output to inform that the electronic paper is associated with the electronic document and to prompt a user to place another electronic paper on an appropriate place. By doing this, it is possible to reduce a user's workload of consecutively writing pages of a normal electronic document.

FIGS. 7A to 7C show a display example when the "display format" is set so as to include an image indicating presence of pages before and after the page to be written, in the page image to be written.

FIG. 7A shows an electronic paper 1 on which a page image of a representative page (the starting page) is written, and in which an image Mb indicating that presence of a next page is displayed at the right lower corner of the electronic paper 1. FIG. 7B shows an electronic paper 1 on which a page image of an intermediate page is written, and in which an image Ma indicating presence of a previous page is displayed at the left lower corner of the electronic paper 1 and an image Mb indicating presence of a next page is displayed at the right lower corner of the electronic paper 1. FIG. 7C shows an electronic paper 1 on which a page image of the last page is written, and in which an image Ma indicating presence of a previous page is displayed at the left lower corner of the electronic paper 1.

In the figure, the image Mb (or Ma) indicating the presence of the previous or next page is shown as a reduced image of the page. The image Mb (or Ma) may be any image so long as it enables a user to recognize the presence of the previous or next page, such as an image of a text string or a symbol meaning or symbolizing the previous or next page, or an image of an abstracted figure.

FIGS. 8A to 8C show display examples when the "display format" is set so as to include an image indicating as to whether or not the electronic paper 1 is associated with an electronic document, in the page image to be written.

FIG. 8A shows an electronic paper 1 associated with an electronic document, i.e., shows the electronic paper 1 on which a page image of a representative page (the starting page) is written, and in which an image Mc indicating a representative image is displayed at the left upper corner of the electronic paper 1. FIGS. 8B and 8C show an electronic paper 1, which is not associated with an electronic document, i.e., shows the electronic paper 1 on which a page image of an intermediate page or the last page is written, and in which an image Md indicating that the displayed image is not the representative image is displayed at the left upper corner of the electronic paper 1.

In the figure, the image Mc indicating the representative page is shown as a list of the reduced images of other pages of the electronic document. However, the image Mc may be any image so long as the image enables a user to recognize it as the representative image, such as an image indicating the number of pages contained in the electronic document, an image indicating a file name of the electronic document, an image indicating a creator or a created year, month, and day, or a two-dimensional barcode image identifying the electronic document.

Figures 9, 10:
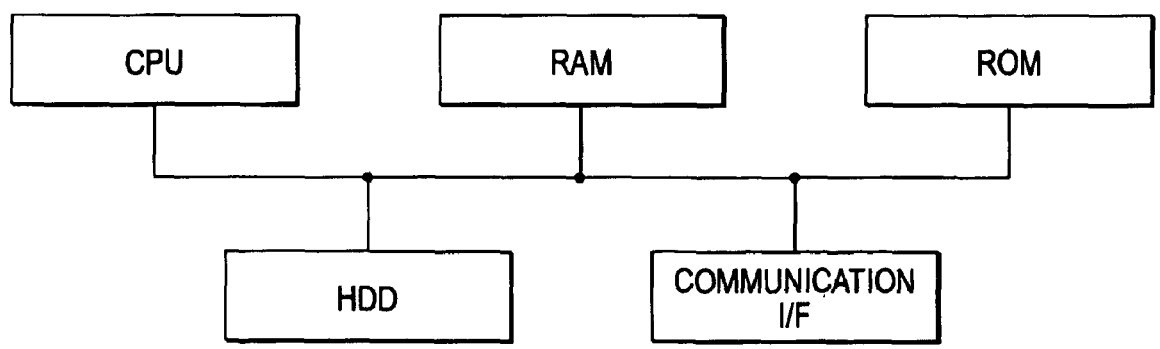
FIG. 9 is a diagram showing an example of data of related information according to the exemplary embodiment of the invention.
FIG. 10 is a diagram showing the hardware configuration of the writing apparatus according to the exemplary embodiment of the invention.

In this exemplary embodiment, the case has been described in which the ID information (document ID) or the display format of the electronic document associated with the electronic paper 1 is stored in the storage section 11 of the electronic paper 1. As shown in FIG. 9, a storage unit for storing association information that associates the identification information (medium ID) of the electronic paper 1 with the identification information (document ID) of the electronic document associated with the electronic paper 1 may be provided in the writing apparatus 2 or another apparatus so that the electronic document associated with the electronic paper can be identified based on the identification information of the electronic paper 1 read from the electronic paper 1.

FIG. 10 shows the main hardware configuration of the writing apparatus 2 of this exemplary embodiment.

Specifically, the writing apparatus 2 of this exemplary embodiment is configured by a computer having hardware resources including a CPU for performing various arithmetic processes, a RAM serving as a work area of the CPU, a ROM for storing a basic control program, an HDD for storing a program for performing the functions according to the exemplary embodiment of the invention, and a communication I/F which is an interface for communication between other apparatuses.

When a program according to the exemplary embodiment of the invention is read from the HDD, expanded into the RAM, and executed by the CPU, the storage function (the control-information storage device 25), the identifying function (the identifying unit 23), the control function (the control unit 24), and the update function (the update unit 27) according to the exemplary embodiment of the invention are performed by the computer of the writing apparatus 2.

The program according to the exemplary embodiment of the invention is supplied to a person practicing the exemplary embodiment of the invention in the form of distribution of an external storage medium such as CD-ROM having the program stored therein or in the form of transmission via a network.

The respective functional units of the writing apparatus 2 according to the invention are not limited to the exemplary embodiment in which they are embodied as a software as shown in this example. Each of them may be constructed as a specific-purpose hardware module.

The respective functional units of the writing apparatus 2 according to the invention are not limited to the exemplary embodiment in which they are provided in one computer as shown in this example. They may be provided in a distributed manner over plural computers.

Figure 11:
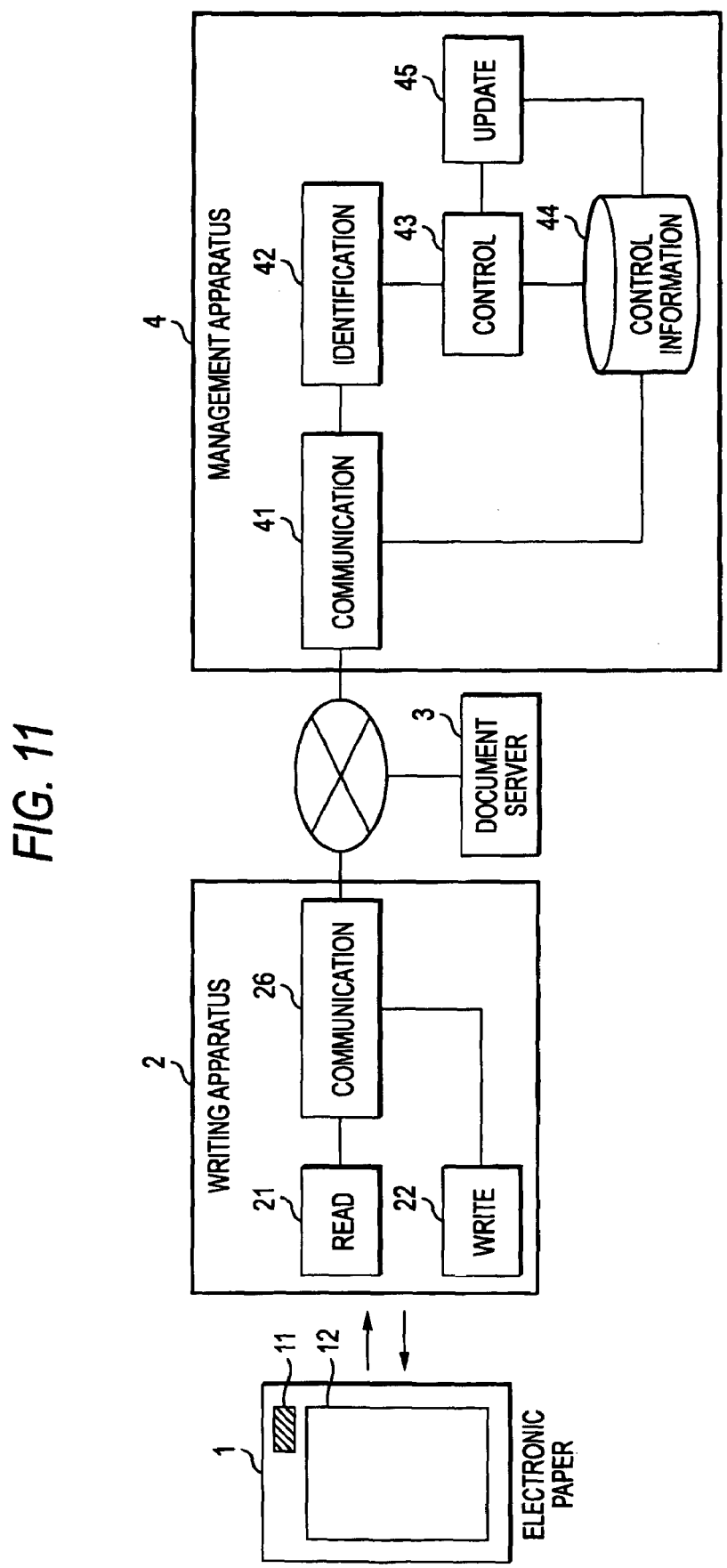
FIG. 11 is a functional block diagram of a writing control system according to another exemplary embodiment of the invention.

FIG. 11 is a functional block diagram of a writing control system according to another exemplary embodiment of the invention.

The writing control system of this example includes an electronic paper 1, a writing apparatus 2 for writing and displaying a page image of an electronic document on the electronic paper 1, a document server 3 for storing data of the electronic document, and a management apparatus 4 for managing the writing apparatus 2.

Figures 12, 13:
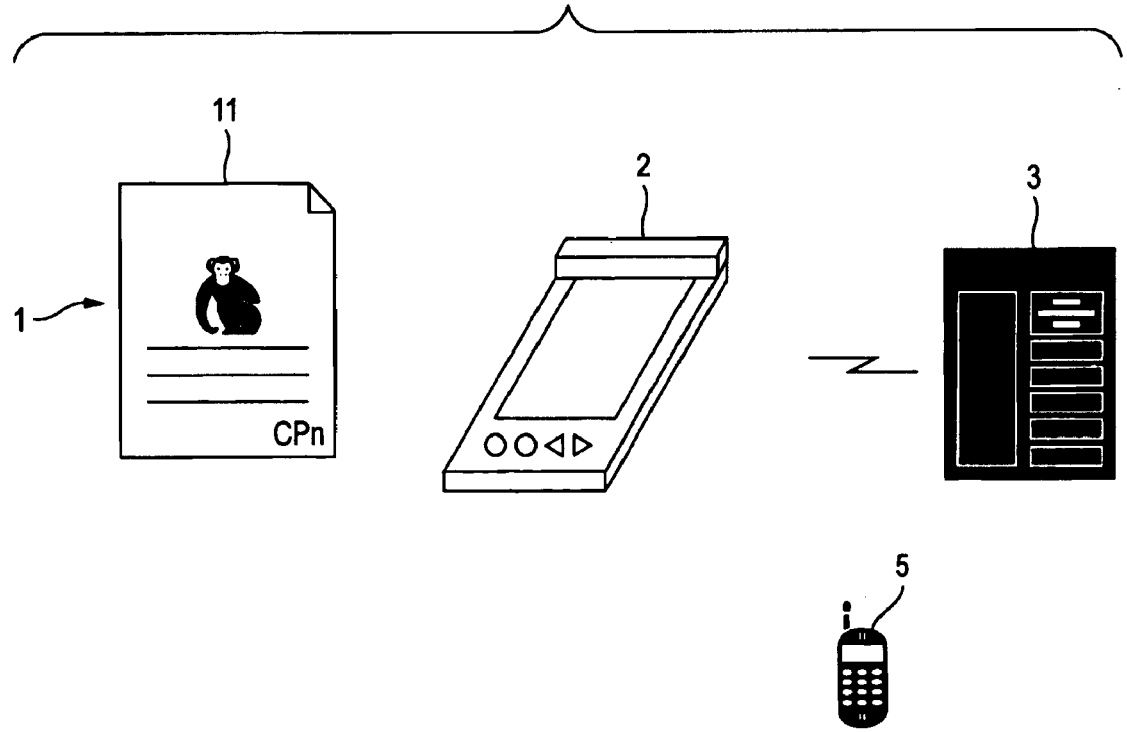
FIG. 12 is a diagram showing an example of data stored in a control-information storage device according to the other exemplary embodiment of the invention.
FIG. 13 is a diagram for explaining an example of a process of associating an electronic document with an electronic paper.

In the writing control system of this exemplary embodiment, the writing apparatus 2 does not include the identifying unit 23, the control unit 24, the control-information storage device 25 and the update unit 27, which are provided in the writing control system of FIG. 1. Instead, the management apparatus 4 includes an identifying unit 42, a control unit 43, a control-information storage device 44, and an update unit 45, which correspond to the above units/device. As shown in FIG. 12, the control-information storage device 44 stores identification information (writing apparatus ID) of the writing apparatus 2 and control information relating to the writing apparatus 2 in association with each other so that the control information is managed for each writing apparatus 2.

According to the writing control system of this exemplary embodiment, if a user presents an electronic paper 1 to the writing apparatus 2, information stored in the storage section 11 of the electronic paper 1 is read by the reading unit 21 and is transmitted to the management apparatus 4 by the communication unit 26.

Upon receipt of the read information from the writing apparatus 2 by the communication unit 41, the management apparatus 4 identifies an electronic document associated with the electronic paper 1, which is presented to the writing apparatus 2.

If the electronic document associated with the electronic paper 1 is identified, the update unit 45 updates the control information, which relates to the writing apparatus 2 and which is stored in the control-information storage device 44, and the control unit 43 identifies a page to be written by the writing apparatus 2 based on the control information, which relates to the writing apparatus 2 and which is stored in the control-information storage device 44, and causes the writing apparatus 2 to write and display the image of the identified page to be written on the display section 12 of the electronic paper 1. Also, if the page image is written into the electronic paper 1 by the writing apparatus 2, the update unit 45 updates the control information, which relates to the writing apparatus 2 and is stored in the control-information storage device 44.

On the other hand, If the electronic document associated with the electronic paper 1 is not identified, the control unit 43 identifies a page to be written by the writing apparatus 2 (a page, which has not yet been written, of an electronic document, which is used in the last image writing) based on the control information, which relates to the writing apparatus 2 and which is stored in the control-information storage device 44, and causes the writing apparatus 2 to write and display the image of the identified page to be written on the display section 12 of the electronic paper 1. Also, if the page image is written into the electronic paper 1 by the writing apparatus 2, the update unit 45 updates the control information, which relates to the writing apparatus 2 and which is stored in the control-information storage device 44.

Here, the management apparatus 4 of this exemplary embodiment is configured by a computer having hardware resources including a CPU, a RAM, a ROM, an HDD, and a communication I/F, similar to the hardware configuration shown in FIG. 9 in connection with the writing apparatus 2 of the writing control system of FIG. 1. When the program according to the exemplary embodiment of the invention is executed by using the hardware resources, the storage function (the control-information storage device 44), the identifying function (the identifying unit 42), the control function (the control unit 43), and the update function (the update unit 44) according to the exemplary embodiment of the invention are performed by the computer of the management apparatus 4.

The program according to the exemplary embodiment of the invention is supplied to a person practicing the invention in the form of distribution of an external storage medium such as CD-ROM having the program stored therein or in the form of transmission via a network.

The respective functional units of the management apparatus 4 according to the invention are not limited to the exemplary embodiment in which they are embodied as a software as shown in this example. Each of them may be constructed as a specific-purpose hardware module.

The respective functional units of the management apparatus 4 according to the invention are not limited to the exemplary embodiment in which they are provided in one computer as shown in this example. They may be provided in a distributed manner over plural computers.

Next, a process of associating an electronic document and an electronic paper 1, which is performed as a preparatory step of the writing control according to the exemplary embodiments of the invention, will be described.

For example, as shown in FIG. 13, in a state where an electronic paper 1 which is not associated with an electronic document (for example, an electronic paper 1 in which identification information of an electronic document is not stored in the storage section 11) is placed on the writing apparatus 2, if a user operates a user terminal 5 such as a cellular phone to designate an electronic document, the page image of the electronic document is written and displayed on the display section 12 of the electronic paper 1 by the writing apparatus 2, and identification information of the electronic document is stored in the storage section 11 of the electronic paper 1 by the writing apparatus 2.

That is, since the page image of the electronic document can be displayed on the electronic paper 1 by associating the electronic document and the electronic paper 1 using the writing apparatus 2, a user can confirm that the electronic document is associated with the electronic paper 1 by looking at the display of the electronic paper 1.

Also, accompanied by the association, the control information relating to the writing apparatus 2 is updated, and thereafter, when the electronic paper 1 which is not associated with an electronic document is placed on the writing apparatus 2, the subsequent page image is written and displayed on the electronic paper 1.

Figure 14:
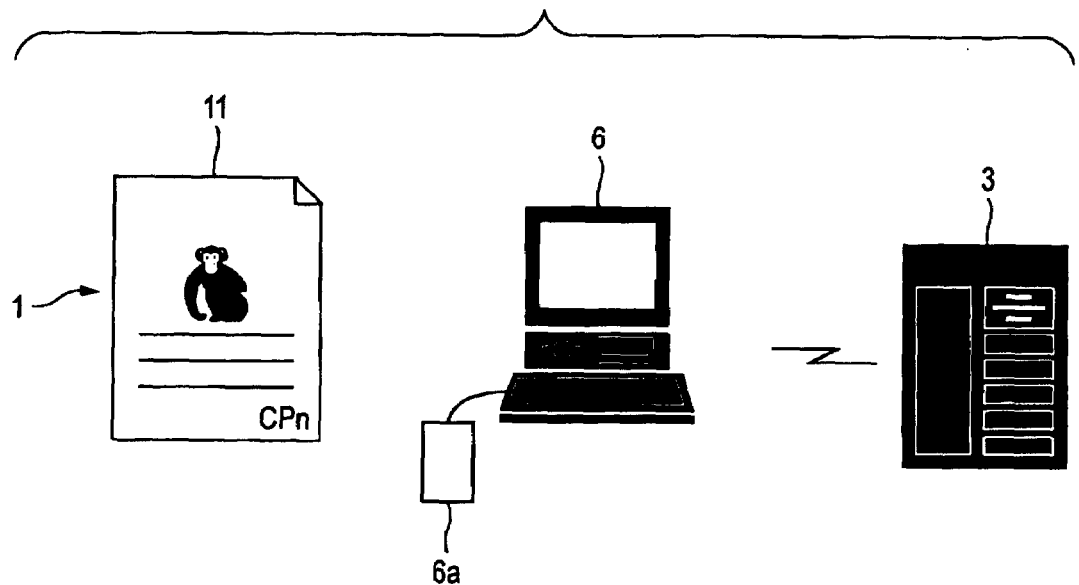
FIG. 14 is a diagram for explaining another example of the process of associating the electronic document with the electronic paper.

Also, for example, as shown in FIG. 14, if an access device 6a for accessing the storage section 11 of the electronic paper 1 is provided in the user terminal 6 and if a user operates the user terminal 6 to designate an electronic document, identification information of the electronic document is stored in the storage section 11 of the electronic paper 1 by the access device 6a.

Figure 15:
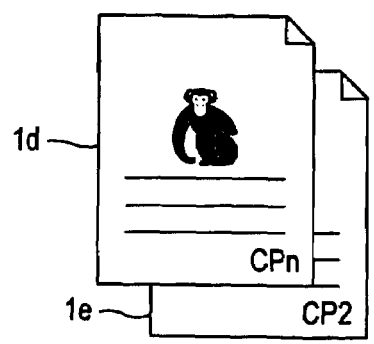
FIG. 15 is a diagram for explaining further another example of the process of associating the electronic document with the electronic paper.

Also, for example, as shown in FIG. 15, an electronic paper 1d which is associated with an electronic document and an electronic paper 1e which is not associated with an electronic document are presented to the writing apparatus 2 or the access device 6a in an overlapped state, the identification information of the electronic document associated with the electronic paper 1d is copied to the electronic paper 1e.

What is claimed is:

1. A writing control system comprising:
a display holding medium including
a display section capable of displaying and holding an image in a no-power state and rewriting the image, and
a storage section having a storage area for storing information that identifies an electronic document associated with the display holding medium;
a reading unit that reads the information from the storage section of the display holding medium when the display holding medium is located in a predetermined position;
an identifying unit that identifies the electronic document associated with the display holding medium, based on the information read from the storage section of the display holding medium;
a control unit, wherein when the electronic document associated with the display holding medium is not identified, the control unit performs control so that a page image, which has not been written, of an electronic document, which is used in last image writing, is set as a writing target; and
a writing unit that writes the page image of the writing target into the display section of the display holding medium.

2. The writing control system according to claim 1, wherein when the electronic document associated with the display holding medium is identified, the control unit performs the control so that a page image of the identified electronic document is set to the writing target.

3. The writing control system according to claim 1, further comprising:
a writing apparatus including
the reading unit,
the writing unit,
the identifying unit,
the control unit,
a storage unit that stores information that identifies the page, which has not been written, of the electronic document, which is used in the last image writing performed by the writing apparatus, and
an update unit that updates the information stored in the storage unit in response to image writing performed by the writing apparatus, wherein
when the electronic document associated with the display holding medium is not identified, the control unit performs the control so that the page image, which has not been written, of the electronic document, which is used in the last image writing, is identified based on the information stored in the storage unit and is set as the writing target.

4. The writing control system according to claim 1, further comprising:

a writing apparatus including
the reading unit, and
the writing unit; and
a management apparatus including
the identifying unit,
the control unit,
a storage unit that stores (i) information identifying the writing apparatus and (ii) information identifying the page image, which has not been written, of the electronic document, which is used in the last image writing performed by the writing apparatus, in association with each other, and
an update unit that updates information, which relates to the writing apparatus and which is stored in the storage unit, in response to image writing performed by the writing apparatus, wherein
when the electronic document associated with the display holding medium is not identified based on the information, which is read by the writing apparatus from the storage section of the display holding medium, the control unit performs the control so that the page image, which has not been written, of the electronic document, which is used in the last image writing performed by the writing apparatus, is identified based on the information, which relates to the writing apparatus and which is stored in the storage unit, and is set as the writing target.

5. The writing control system according to claim 1, wherein
the storage section of the display holding medium has the storage area, which stores information that identifies a display format of page images of the electronic document associated with the display holding medium,
the identifying unit further identifies the display format of the page images of the electronic document associated with the display holding medium based on the information read from the storage section of the display holding medium, and
the control unit performs the control so that the identified display format is set as a display format of the page image, which is the writing target.

6. The writing control system according to claim 1, wherein when a page image which has not been written exists even after current image writing, the control unit includes an image that indicates the page image, which has not been written exists, in the writing target.

7. The writing control system according to claim 1, wherein the control unit includes an image that indicates as to whether the electronic document is associated with a display holding medium, which is a destination of the image writing, in the writing target.

8. A writing apparatus comprising:
a reading unit, wherein
when a display holding medium is located in a predetermined position, the reading unit reads information from a storage section of a display holding medium, and
the display holding medium includes
a display section capable of displaying and holding an image in a no-power state and rewriting the image, and
the storage section having a storage area for storing information that identifies an electronic document associated with the display holding medium;
a storage unit that storing information that identifies a page image, which has not been written, of an electronic document which is used in last image writing performed by the writing apparatus;
an identifying unit that identifies the electronic document associated with the display holding medium based on the information read from the storage section of the display holding medium;
a control unit, wherein when the electronic document associated with the display holding medium is not identified, the control unit performs control so that the page image, which has not been written, of the electronic document, which is used in the last image writing and which is identified based on the information stored in the storage unit, is set as a writing target;
a writing unit that writes the page image of the writing target into the display section of the display holding medium; and
an update unit that updates the information stored in the storage unit in response to the writing of the page image of the writing target.

9. A writing apparatus, comprising:
a reading unit, wherein
when a display holding medium is located in a predetermined position, the reading unit reads information from a storage section of the display holding medium,
the display holding medium includes
a display section capable of displaying and holding an image in a no-power state and rewriting the image, and
the storage section having a storage area for storing information that identifies an electronic document associated with the display holding medium;
a communication unit that communicates with a management apparatus that identifies the electronic document associated with the display holding medium based on the information read from the storage section of the display holding medium, wherein when the electronic document associated with the display holding medium is not identified, the management apparatus performs control so that a page image, which has not been written, of an electronic document, which is used in last image writing, is set as a writing target; and
a writing unit that writes the page image of the writing target into the display section of the display holding medium.

10. A management apparatus comprising:
a communication unit that communicates with a writing apparatus, wherein
when a display holding is located in a predetermined position, the communication unit reads information from a storage section of the display holding medium,
the display holding medium includes
a display section capable of displaying and holding an image in a no-power state and rewriting the image, and
the storage section having a storage area for storing information that identifies an electronic document associated with the display holding medium, and
the writing apparatus writes a page image of the electronic document into the display section of the display holding medium, based on the information read from the storage section;
a storage unit that stores (i) information identifying the writing apparatus and (ii) information identifying a page image, which has not been written, of an electronic document, which is used in last image writing performed by the writing apparatus, in association with each other;
an identifying unit that identifies the electronic document associated with the display holding medium based on the information, which is read from the storage section of the display holding medium by the writing apparatus;
a control unit, wherein when the electronic document associated with the display holding medium is not identified based on the information, which is read from the storage section of the display holding medium by the writing apparatus, the control unit performs control so that the page image, which has not been written, of the electronic document, which is used in the last image writing performed by the writing apparatus, is identified based on information, which relates to the writing apparatus and which is stored in the storage unit, and is set as a target to be written by the writing apparatus; and
an update unit that updates the information, which relates to the writing apparatus and which is stored in the storage unit, in response to the writing of the page image of the target to be written by the writing apparatus.

11. A non-transitory computer-readable medium storing a program that causes a computer of a writing apparatus to execute a writing process, wherein
the writing apparatus includes a reading unit and a writing unit,
when a display holding medium is located in a predetermined position, the reading unit reads information from a storage section of the display holding medium,
the display holding medium includes
a display section capable of displaying and holding an image in a no-power state and rewriting the image, and
the storage section having a storage area for storing information that identifies an electronic document associated with the display holding medium, and
the writing unit writes a page image of the electronic document into the display section of the display holding medium based on the information read from the storage section, the writing process comprising:
storing information that identifies a page image, which has not been written, of an electronic document, which is used in last image writing performed by the writing unit;
identifying the electronic document associated with the display holding medium, based on the information read from the storage section of the display holding medium;
when the electronic document associated with the display holding medium is not identified, performing control so that the page image, which has not been written, of the electronic document, which is used in the last image writing, is identified based on the stored information is set as a writing target; and
updating the stored information in response to the writing, performed by the writing unit, of the page image of the writing target.

12. A non-transitory computer-readable medium storing a program that causes a computer of a management apparatus to execute a management process, wherein
the management apparatus communicates with a writing apparatus,
when a display holding medium is located in a predetermined position, the writing apparatus reads information from a storage section of the display holding medium,
the display holding medium includes
a display section capable of displaying and holding an image in a no-power state and rewriting the image,
the storage section having a storage area for storing information that identifies the electronic document associated with the display holding medium,
the writing apparatus writes a page image of the electronic document into the display section of the display holding medium based on the information read from the storage section, the management process comprising:
storing (i) information identifying the writing apparatus and (ii) information identifying a page image, which has not been written, of an electronic document, which is used in last image writing performed by the writing apparatus, in association with each other;
identifying the electronic document associated with the display holding medium, based on the information, which is read from the storage section of the display holding medium by the writing apparatus;
when the electronic document associated with the display holding medium is not identified based on the information, which is read from the storage section of the display holding medium by the writing apparatus, performing control so that the page image, which has not been written, of the electronic document, which is used in the last image writing performed by the writing apparatus, is identified based on information, which relates to the writing apparatus and which is stored, and is set as a target to be written by the writing apparatus; and
updating the information, which relates to the writing apparatus and is stored, in response to the writing of the page image of the target to be written by the writing apparatus.

* * * * *